(12) United States Patent
Chiang et al.

(10) Patent No.: US 8,157,907 B2
(45) Date of Patent: Apr. 17, 2012

(54) COATING COMPOSITION FOR LOW-REFRACTIVE INDEX ANTI-REFLECTION FILM

(75) Inventors: Anthony Shiaw-Tseh Chiang, Jhongli (TW); Shiao-Yi Li, Hualien (TW)

(73) Assignee: National Central University, Jhongli, Taoyuan County (TW)

( * ) Notice: Subject to any disclaimer, the term of this patent is extended or adjusted under 35 U.S.C. 154(b) by 521 days.

(21) Appl. No.: 12/388,613

(22) Filed: Feb. 19, 2009

(65) Prior Publication Data

US 2009/0205536 A1 Aug. 20, 2009

(30) Foreign Application Priority Data

Feb. 19, 2008 (TW) ................................ 97105673 A

(51) Int. Cl.
*C09D 1/00* (2006.01)
*C09D 5/00* (2006.01)
(52) U.S. Cl. .................... 106/287.16; 423/704; 423/707
(58) Field of Classification Search .............. 106/287.16; 423/704, 707

See application file for complete search history.

(56) References Cited

U.S. PATENT DOCUMENTS

| 6,918,957 | B2 | 7/2005 | Kursawe et al. |
| 7,128,944 | B2 | 10/2006 | Becker et al. |
| 7,241,505 | B2 | 7/2007 | Glaubitt et al. |
| 7,253,130 | B2 | 8/2007 | Chiang et al. |
| 7,381,461 | B2 | 6/2008 | Chiang et al. |
| 2007/0014981 | A1* | 1/2007 | Chiang et al. .............. 428/310.5 |

OTHER PUBLICATIONS

HUPC:The life of color in the HUPC, Cellulose-Nitrates. Downloaded Sep. 9, 2011.*
Li et al, "The nucleation period for TPA-silicalite-1 crystallization . . . " Microporous and Mesoporous Materials 31 (1990), pp. 141-150.*
de Moor et al, In situ Observation of Nucleation and Crystal Growth . . . ) J. Phys. Chem. B (1999) 103, 1639-1650.*
Li, et al.; "Mechanical and Dielectric Properties of Pure-Silica-ZeoliteLow-k Material;" Angew. Chem. Int. Ed., 2006, pp. 6329-6332.
Coudurier, et al.; "Uses of I.R. Spectroscopy in identifying ZSM Zeolite Structure;" J. Chem. Soc., Chem. Commun., 1982.
Hsu, et al.; "Rapid Synthesis of MFI Zeolite Nanocrystals;" J.Phys. Chem., 2005, pp. 18804-18814.
Nair, et al.; "Infrared Reflectance Measurements of Zeolite Film Thickness, Refractive Index and Other Characteristics;" Microporous and Mesoporous Materials, 2003, pp. 81-89.
Hattori; "Anti-Reflection Surface with Particle Coating Deposited by Electrostatic Attraction;" Adv.Mater. 2001,13, No. 1, Jan. 5, pp. 51-54.

* cited by examiner

*Primary Examiner* — David M Brunsman
(74) *Attorney, Agent, or Firm* — Thomas, Kayden, Horstemeyer & Risley, LLP

(57) ABSTRACT

A coating composition comprising zeolite nanocrystals, a zeolite precursor solution, and wetting agents in a mixture of solvents is provided. The coating composition can be used to form a transparent layer having a low refractive index on a substrate for antireflection effect.

7 Claims, 8 Drawing Sheets

COATING COMPOSITION FOR LOW-REFRACTIVE INDEX ANTI-REFLECTION FILM

RELATED APPLICATIONS

This application claims priority to Taiwan Application Serial Number 97105673, filed Feb. 19, 2008, which is herein incorporated by reference.

BACKGROUND

1. Field of the Invention

The invention relates to a stable composition comprising zeolite nanocrystals and zeolite precursor nanoparticles for producing an abrasion-resistant anti-reflection layer, having a refractive index close to the optimum refractive index of 1.22, on substrates, preferably glass, and to a process for the preparation of such composition. The anti-reflection layer reduces the reflection of light over a broad spectrum, which is particularly suitable for protective cover of flat panel display or photovoltaic solar panels.

2. Description of Related Art

Anti-reflective (AR) film is generally disposed on an outermost surface of an image display device, such as the polarizing film for a liquid crystal display (LCD), the front plate of a touch panel (PET substrate), the front plate of a projection television (PC substrate), the front plate of a cathode ray tube display or plasma display panel (glass substrate), to reduce reflectance and prevent optical interference or image glare caused by external light or enhancing the visibility of image. It is also needed in the solar panel covering glass to enhance the penetration of incident light.

There are several approaches to produce the desired anti-reflection effect. The first approach is to coat a multiple-layered stack with alternating high and low refractive index materials. To achieve the desired anti-reflection effect, a tight thickness control of each layer is needed, so that the destructive interference occurred at the target wavelength range. However, the processing of multilayer is cumbersome and thus the productivity is low. There are increasing needs to find an easier alternative.

Another alternative may be to create a gradient refractive index along the thickness of the coated film. Such gradient index is known to produce a broadband anti-reflection effect. Particularly, a single-layer antireflective film having a gradient refractive index can be obtained by various methods, such as etching, sol-gel, phase separation, micro-imprinting, or molding. In the extreme case, a single layer of ~110 nm silica particle electrostatically anchored to the substrate via polyelectrolyte had been reported to reduce >90% of reflection in visible range (H. Hattori, Adv. Mater. 2001, 13, 51-54).

Besides the conventional multiple coatings and gradient refractive index layer, it is also possible to generate an anti-reflection action by means of a single coating. The simplest design of an single layer AR film would be just a monolayer with a refractive index (n) of $n=(n_o * n_{sub})^{1/2}$, where $n_o$ is the refractive index of air and $n_{sub}$ is the refractive index of the substrate, and with an optical thickness of λ/4, where λ is the wavelength where the reflection is to be minimized. For glass substrate with a refractive index of 1.52, this means a refractive index of 1.23, and a thickness of 110 nm to reach zero reflection at ~540 nm. The most-used anti-reflection monolayer of this type is a λ/4 layer of $MgF_2$ having a refractive index of 1.38 applied by vapor deposition.

To achieve a refractive index below 1.3, the only possibility is to using porous materials. Typically, a porous AR coating is made of silica sol-gel with sacrificed porogen to create nanopores, such as that disclosed in U.S. Pat. Nos. 6,918,957 and 7,128,944. In these inventions, a hybrid sol comprising surfactants and 10-60 nm sized silicon oxide hydroxide nanoparticles was coated on glass. Subsequent removal of the organics at 600° C. produces a porous layer capable of anti-reflection effect. To improve the abrasion resistance, U.S. Pat. No. 7,241,505 further described the partitioning of these silicon oxide hydroxide nanoparticles into two size fractions with specific weight ratios. In the above-mentioned patents, the silicon oxide hydroxide nanoparticles were made from a process where tetraalkoxysilane was added to an aqueous-alcoholic ammoniacal hydrolysis mixture.

For porous silica film to achieve the desired refractive index, roughly 58% porosity is needed. The mechanical strength would be impaired if the skeleton is not strong enough. Zeolite, a crystalline tectosilicates having a low refractive index of ~1.3 (S. Nair, M. Tsapatsis, *Micropor. Mesopor. Mater.* 2003, 58 81-89) and an elastic modulus above 30 GPa (Z. J. Li, M. C. Johnson, M. W. Sun, E. T. Ryan, D. J. Earl, W. Maichen, J. I. Martin, S. Li, C. M. Lew, J. Wang, M. W. Deem, M. E. Davis, Y. S. Yan, *Angew. Chem. Int. Edn* 2006, 45 6329-6332), would be an ideal porous silica to be used for AR coating.

U.S. Pat. No. 7,381,461 described an antireflective transparent zeolite hardcoat, comprising a zeolite nanostructure made of zeolite nanocrystals vertically stacked into a porous structure on a substrate, wherein the porosity increases with structure height, thereby providing a smooth refractive index transition.

In order to obtain a transparent layer of zeolite, U.S. Pat. No. 7,253,130 described a method of preparing a precursor sol capable of forming zeolite, coating the precursor sol to a surface of a substrate, and heating the coated substrate under a temperature between about 120° C. and about 250° C. under a humidity less than a saturation to convert the precursor sol to a transparent zeolite film. However, the conversion of zeolite precursors into zeolite via heating in humidity is rather time consuming.

SUMMARY

The present invention has been made in view of the above-mentioned drawbacks. The inventors of the present invention have found that it is much more effective if a part of the coating composition is zeolite nanocrystals, while the remaining part contains the zeolite precursors that serve as glue to bind the zeolite nanocrystals together and as a reactant to transform into zeolite under heating. Such a coating composition can be directly applied on the desired object and be converted to an effective zeolite anti-reflection film upon heat treatment.

An embodiment of the present invention provides a composition useful as a low refractive index anti-reflection coating and a method for forming the composition. The composition comprises a mixture of zeolite nanocrystals, having a particle size of 40-100 nm, and a zeolite precursor sol, prepared from the hydrolytic polycondensation of tetraalkoxysilanes in an aqueous solution of tetraalkylammonium hydroxide, in a mixture of solvents. When such a composition is coated onto substrate, it can be converted to a zeolite layer after only a short period of heating. The abrasive resistance can be adjusted by the ratio of the zeolite nanocrystals and the zeolite precursors in the sol.

These and other features, aspects, and advantages of the present invention will become better understood with reference to the following description and appended claims. It is to be understood that both the foregoing general description and the following detailed description are by examples, and are intended to provide further explanation of the invention as claimed.

DETAIL DESCRIPTIONS

Figure 1:
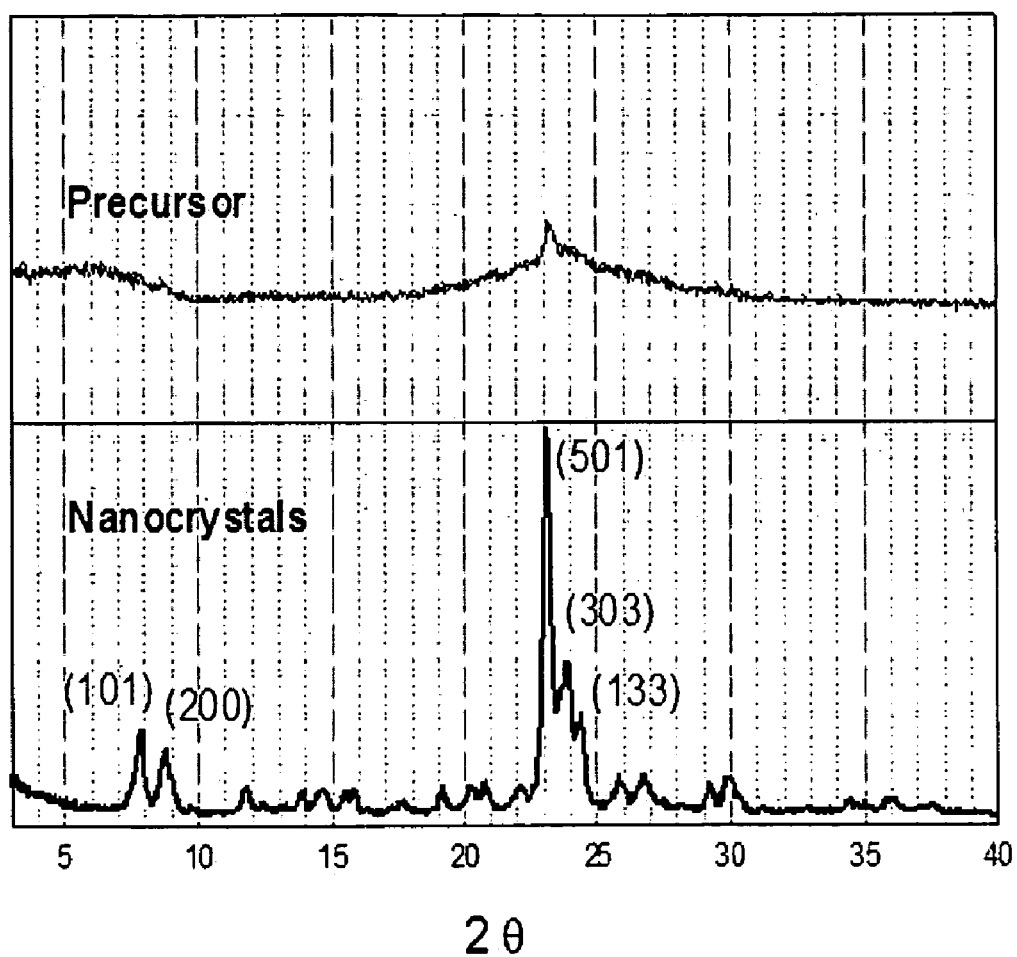
FIG. 1 is a graph showing XRD patterns of the powder obtained from the zeolite precursor sol and the zeolite nanocrystals.

According to an embodiment of this invention, a coating composition for low refractive index anti-reflection layer is disclosed. The coating composition comprises zeolite nanocrystals, a zeolite precursor sol, and a solvent mixture. The zeolite nanocrystals has a particle size of 40-100 nm. The zeolite precursor sol is obtained from the hydrolytic polycondensation of tetraalkoxysilanes in an aqueous solution of tetraalkylammonium hydroxid. Optionally, the coating composition can further comprises a wetting agent, such as a surfactant, for better wetting a substrate to be coated by the coating composition. The concentrations of the zeolite nanocrystals, the zeolite precursor, and the wetting agent are respectively 0.3-4% by weight, 0.3-4% by weight, and 0.03-0.2% by weight, and the composition has a pH of from 7 to 11.

In particularly, the zeolite precursor sol is prepared by heating a concentrated solution made from the hydrolysis of tetraalkoxysilane. The tetraalkoxysilane is added into an aqueous solution of tetraalkylammonium hydroxide. Preferably, the molar ratio of tetraalkylammonium hydroxide to tetraalkoxysilanes is 0.17-0.6. Upon the hydrolysis of the tetraalkoxysilane, the alcohol and the excess water was removed by vacuum evaporation until the silica concentration reaches about 20-40 wt %. The concentrated sol was then heated at a temperature of 40 to 100° C. for a period of 2-200 hours, but before the occurrence of strong Rayleigh scattering, as described by C. Y. Hsu, A. S. T. Chiang, R. Selvin, R. W. Thompson (J. Physical Chemistry B, 2005, 109 18804-18814). The silica concentration in the concentrated zeolite precursor sol is better about 20-40 wt %. Since it is not easy to transform zeolite precursor into zeolite having a uniform size when the silica concentration is too low. But the concentrated sol becomes too sticky as the silica concentration is higher than 40 wt % and thus is unfavorable to the following process. The term of "zeolite precursor" in the present invention refers to the solid portion containing silica, without the liquid portion in the "zeolite precursor sol".

The zeolite nanocrystals having a particle size of 40-100 nm could be produced from a process similar to the above, by prolonged the heating of the concentrated sol after the occurrence of strong Rayleigh scattering, or by subjecting the concentrated sol that already showing strong Rayleigh scattering to a 150 to 250° C. hydrothermal condition to accelerate the zeolite crystallization, or any other method know to the art of zeolite nanocrystals preparation. In the present invention, there is no special limitation to the material of the zeolite. Silica zeolite, aluminum silicate zeolite or titanium silicate zeolite can be used. The type of crystal structure of zeolite is also non-limited, but MFI or BEA zeolite structure is preferred because of ease to form particles in nano size. The molar ratios of tetraalkylammonium hydroxide to tetraalkoxysilanes, in preparing the zeolite precursor sol, are preferably between 0.17 to 0.4 and 0.3 to 0.6 for MFI zeolite structure and BEA zeolite structure respectively. More preferably, the molar ratios of tetraalkylammonium hydroxide to tetraalkoxysilanes are 0.17-0.25 and 0.3-0.4 for MFI zeolite structure and BEA zeolite structure respectively.

Upon mixing the zeolite nanocrystals with the zeolite precursor sol, the composition is further diluted with solvents such as water and/or alcohols, preferably having less than 4 carbons.

The above-described composition can be coated on glass with any known method, such as spin, dip, spray, microgravure, meniscus, web tension coating. The coated object is then subjected to low temperature (<200° C.) curing and high temperature (400-600° C.) calcination to remove the organics (i.e. tetraalkylammonium hydroxide), after which the coated film is converted to a strongly adhered, low refractive index, abrasive resistant anti-reflection film.

As it is clear from the above description, the present invention is different from that disclosed in U.S. Pat. No. 7,253,130, where the zeolite precursor sol is the sole source of silica that eventually converted into a zeolite film.

Since zeolite nanocrystals and zeolite precursor sol prepared from the hydrolytic polycondensation of tetraalkoxysilanes in tetraalkylammonium hydroxide aqueous solution was used in the present invention, it is also different from U.S. Pat. Nos. 6,918,957, 7,128,944 and 7,241,505, where the coating composition was a mixture of amorphous silicon oxide hydroxide nanoparticles, produced in an aqueous-alcoholic ammoniacal solution.

The method according to the present invention is elucidated in detail with reference to the following exemplary embodiments.

Preparation of the Glass Substrates

Chemical strengthen glasses were cleaned in 0.1 N sodium hydroxide solution, washed with water, then again cleaned with Merck cleaning solution (Extran MA-02), further rinsed with water for three times before stored for coating use.

Preparation of Zeolite Precursor Sol

In a 1000 mL PP bottle, 67.7 g of TPAOH (tetrapropyl ammonium hydroxide) solution (40%, V.P. chemicals, India), 223.4 g of water and 138.7 g of TEOS (tetraethylorthosilicate, 99.9%) were added. The mixture becomes a clear solution after stirring for 30 min. The ethanol produced from the hydrolysis of TEOS and excess water was removed by rotary evaporator at 80° C. until a final viscose sol of 127 g was obtained. The product was heated at 80° C. for 24 hours to obtain the zeolite precursor sol.

Preparation of Zeolite Nanocrystal Colloid

The above preparation was repeated once more. However, this time the viscose sol was heated at 80° C. for 48 hours. Afterward, the product was transferred to a Teflon lined autoclave and further reacted at 230° C. for 2 hours. A white colloid containing 67 nm MFI zeolite nanocrystals is obtained.

Preparation of the Coatings

Different compositions were prepared from the above zeolite precursor sol and zeolite nanocrystals. The coating on glass substrates was made with a laboratory dip coater, at a pulling rate of 61 mm/min. After coating, the substrate was cured at 100° C. for 10 min, and then calcined, with 20° C./min heating rate, at 550° C. for 30 min to remove the organics.

Characterization

The size of the particles in the zeolite precursor sol and the zeolite nanocrystal colloid was analyzed by dynamic light scattering (DLS; Nano-ZS from Malvern, 4 mW He—Ne laser at 173 scattering angle). Powder samples were prepared from the respective sol (colloid) by flash drying on hot glass plate and subjected to Powder X-ray diffraction (XRD) measurements on a Shimadzu LAB-X-6000 diffractometer. FT-IR spectra were measured using the KBr wafer technique (1% w/w) in a Jasco-410 FT-IR spectrometer.

The difference between the zeolite precursor particles and zeolite nanocrystals is clearly showed by the DLS analysis results of the zeolite precursor sol and the zeolite nanocrystal colloid given in table 1.

TABLE 1

DLS analysis results of the zeolite precursor sol and colloidal zeolite nanocrystals

| Sample | Z-Average (d. nm) | PDI | Count | Peak (d. nm) |
|---|---|---|---|---|
| Zelite precursor sol | 37.4 | 1.330 | 233.8 | 47.3 |
| Zeolite nanocrystals | 66.7 | 0.042 | 278.0 | 68.9 |

Figure 2:
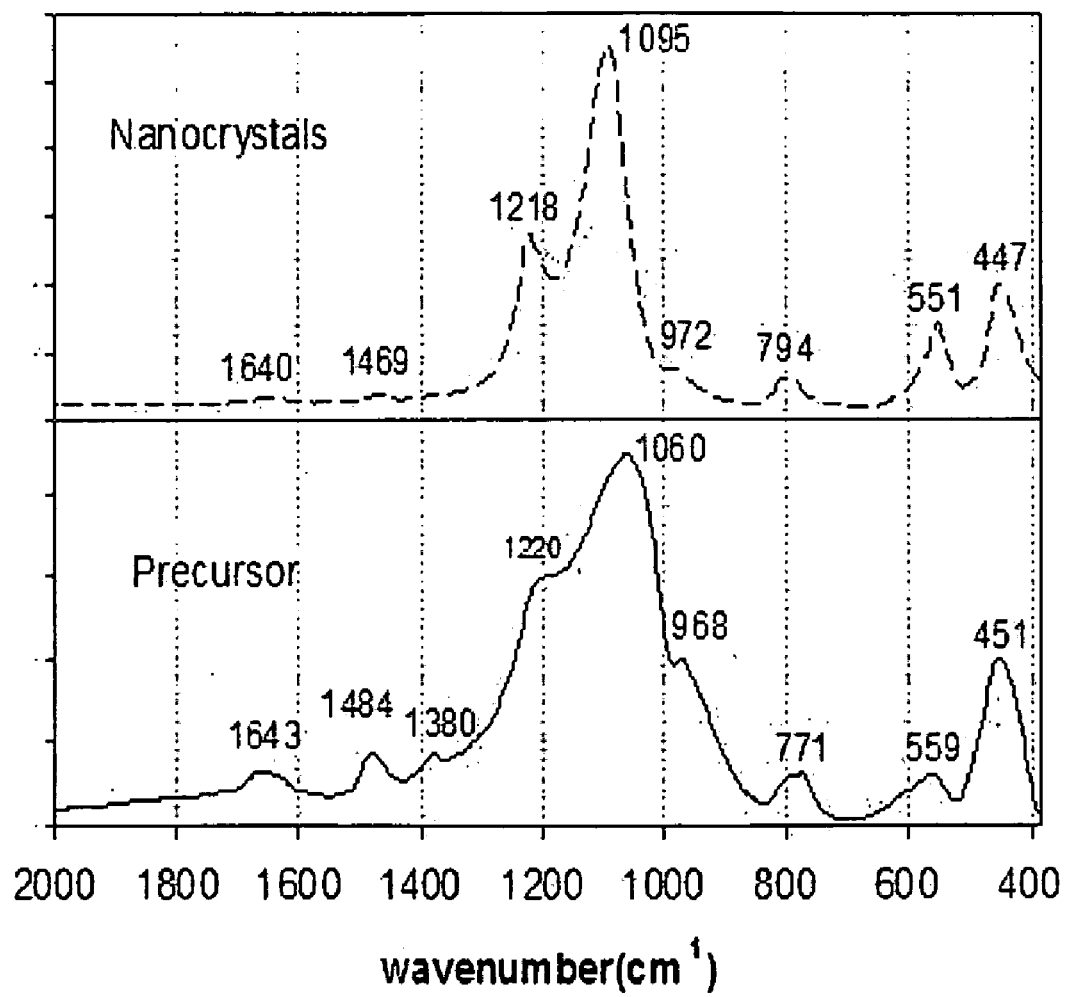
FIG. 2 is a graph showing FTIR spectra of the powder obtained from the zeolite precursor sol and the zeolite nanocrystals.

The zeolite precursor sol had a much larger polydispersity index (PDI) compared to the zeolite nanocrystal colloid. The very small PDI value of the zeolite nanocrystal colloid suggests that the zeolite nanocrystals are very uniform in size. The XRD patterns of the two materials are given in FIG. 1, where the crystallinity of the zeolite nanocrystals is clearly exhibited. The zeolite precursor particles, on the other hand, is practical amorphous. However, the zeolite precursor particles are not the same as silica oxide hydroxide particles obtained by other preparation. As indicated in the IR spectrum given in FIG. 2, the zeolite precursor particles exhibit a small absorption peak at the 559 $cm^{-1}$. According to the optical density ratio (about 0.37) of the about 559 $cm^{-1}$ peak over the 450 $cm^{-1}$ peak, one can judge that around 70% of the silica had formed double ring structures that eventually will lead to zeolite, but was not yet converted to zeolite, as evident from the absence of strong zeolite peaks in FIG. 1. (Coudurier, G.; Naccache, C.; Vedrine, J. C., J. Chem. Soc., Chem. Comm., 1982, 1413-1415). By comparison, the optical density ratio of these peaks is 0.7 for zeolite nanocrystals, indicating again their good crystallinity.

COMPARATIVE EXAMPLE 1

Comparing Characteristics of the AR Coatings Made of Zeolite Precursors and Zeolite Nanocrystals Two coating compositions were prepared in this example. Composition 1A is prepared by diluting the zeolite precursor sol with 95% ethanol to an equivalent silica content of 4 wt %. Composition 1B is done similarly using the zeolite nanocrystal colloid. AR coatings on glass substrates were prepared according to the procedures described above.

Figure 3:
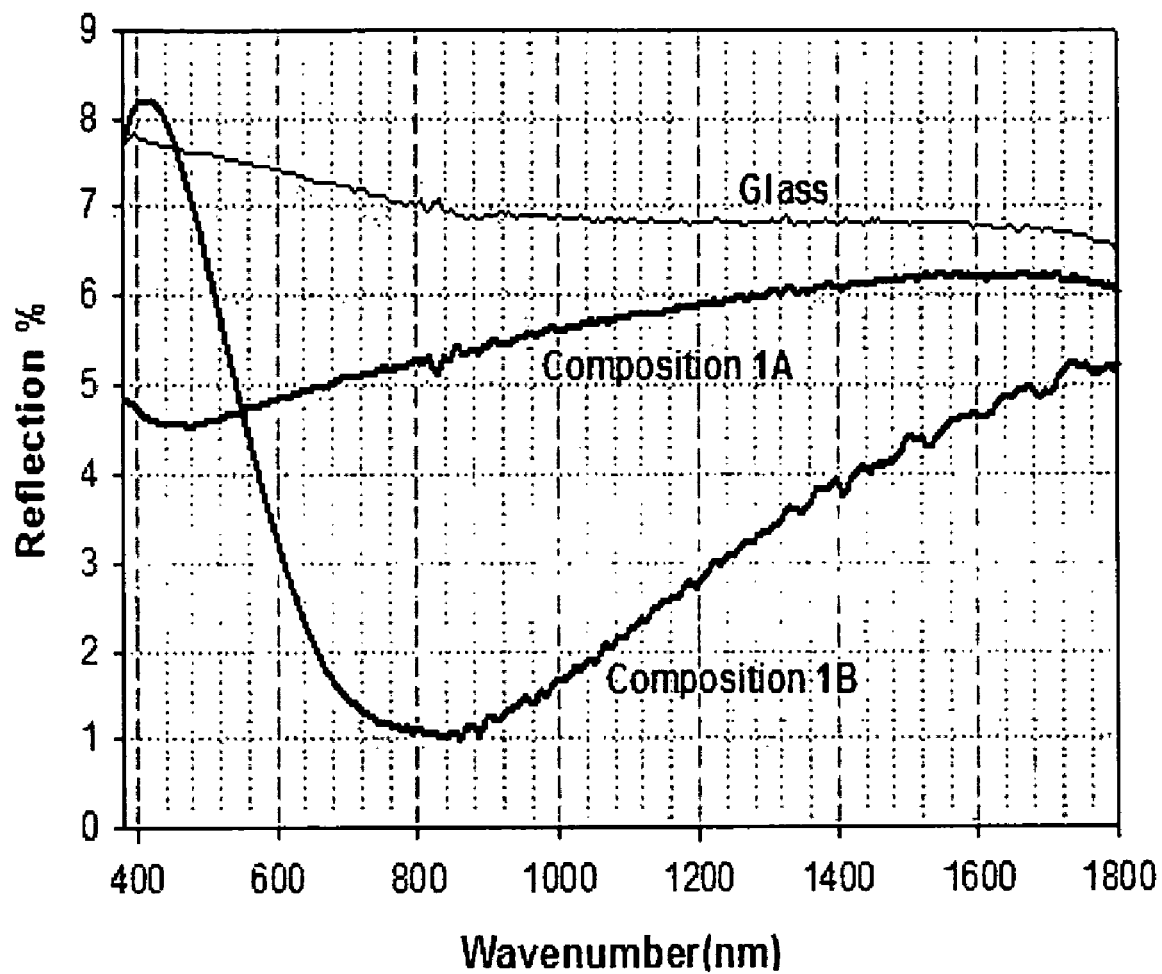
FIG. 3 is a graph showing the reflection spectra obtained from the composition prepared in comparative example 1.

The reflection of the coated glass was measured by Hitachi U-400 spectroscope using an incidence angle of 5 degrees. The strength of the coating was tested according to ASTM D3363-92a pencil hardness method. The results are given in FIG. 3 and Table 2.

TABLE 2

The characteristics of the AR coating prepared in comparative example 1

| | Composition | |
|---|---|---|
| | 1A | 1B |
| Wavelength at minimum reflection (nm) | 450 | 858 |
| Minimum Reflection (%) | 4.8 | 1 |
| Thickness (nm) | 91 | 188 |

TABLE 2-continued

The characteristics of the AR coating prepared in comparative example 1

| | Composition | |
|---|---|---|
| | 1A | 1B |
| Refractive index | 1.43 | 1.128 |
| Porosity | 0.24 | 0.8 |
| Hardness | 3H | H |

We found that composition 1A did not lead to a good anti-reflection effect. The refractive index calculated from the spectrum was only slightly lower than expected from pure silica. The composition 1B prepared from zeolite nanocrystals, on the other hand, lead to an excellent reduction of the reflection. The refractive index calculated was even lower than the optimized value of 1.22. Unfortunately, the film coated with composition 1B was very weak. The pencil hardness was only H at the best. Comparatively, the composition 1A gave much stronger coating.

COMPARATIVE EXAMPLE 2

Figure 4:
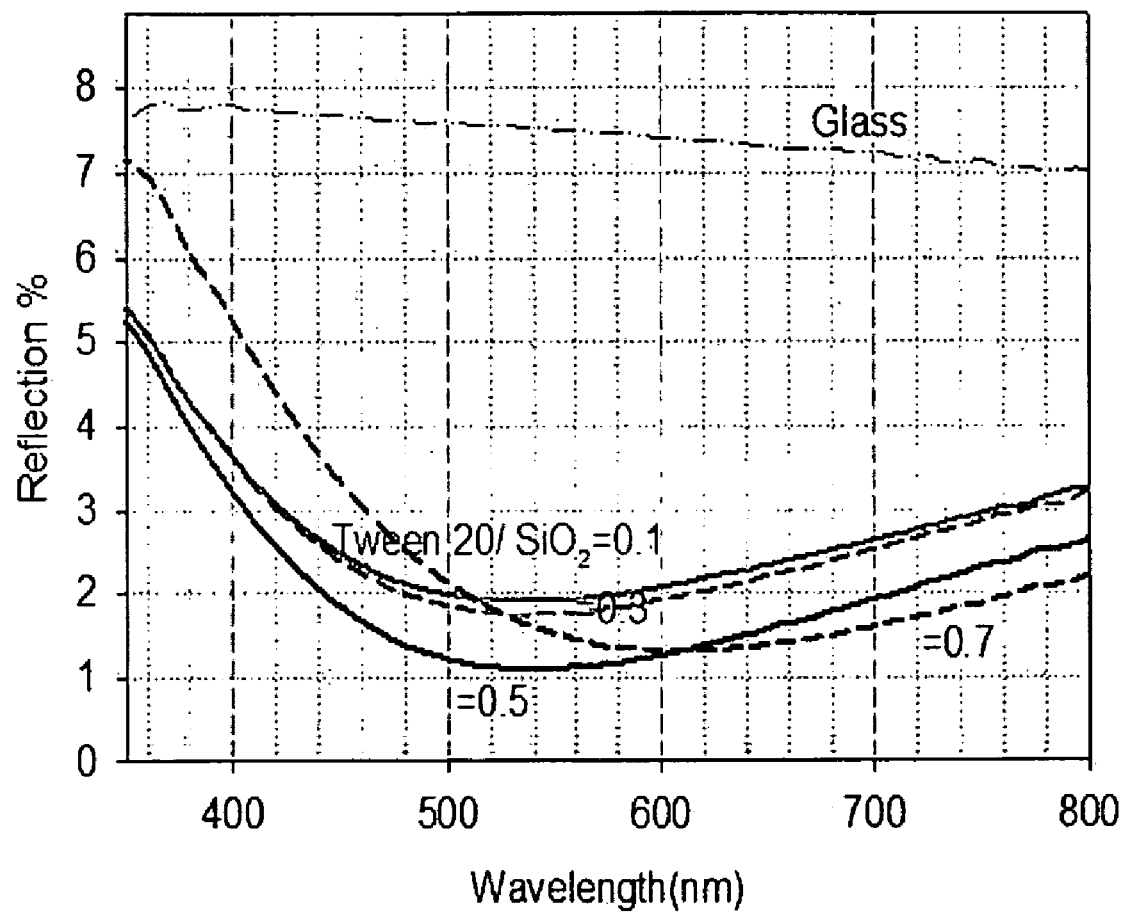
FIG. 4 is a graph showing the reflection spectra obtained from the compositions prepared in comparative example 2 with different amount of Tween 20.
Figure 5:
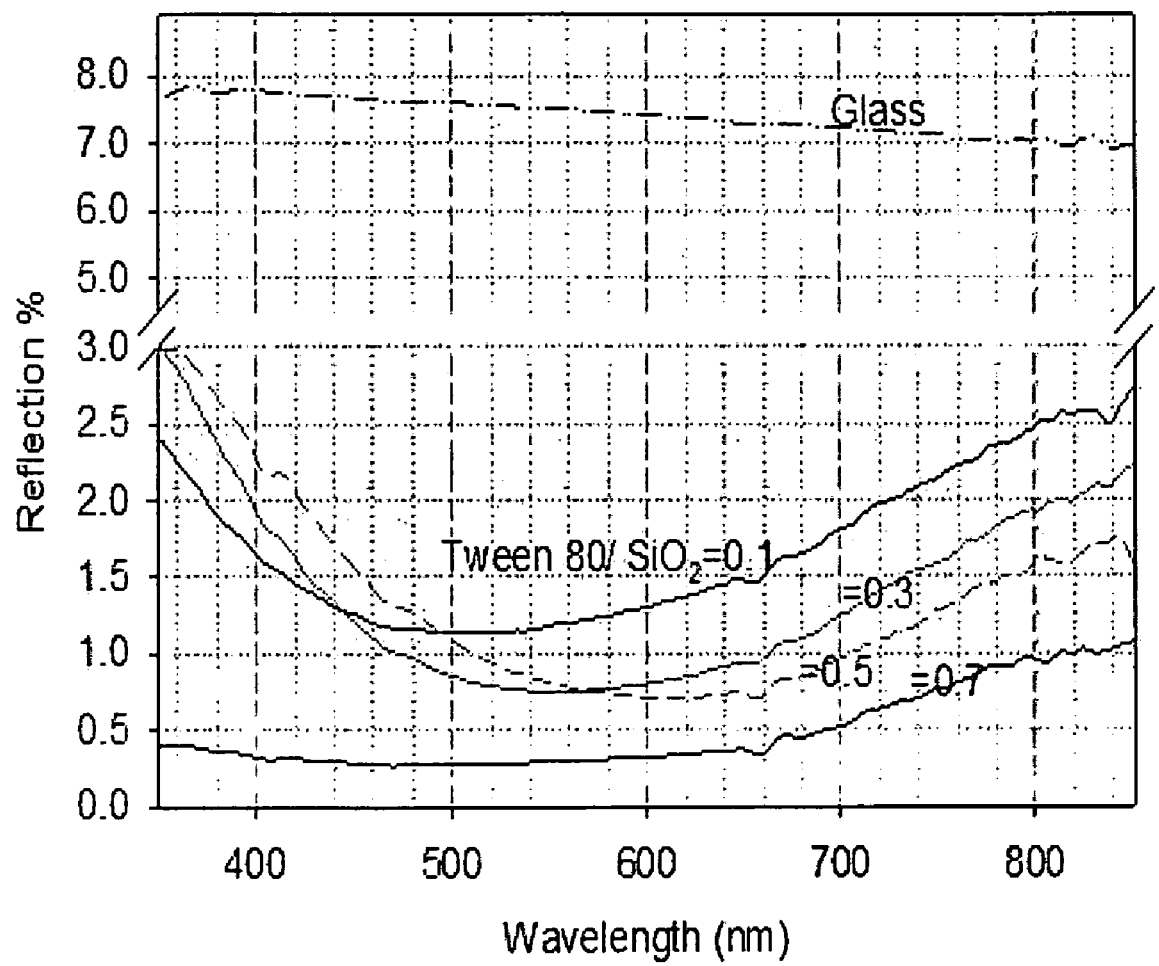
FIG. 5 is a graph showing the reflection spectra obtained from the compositions prepared in comparative example 2 with different amount of Tween 80.
Figure 6:
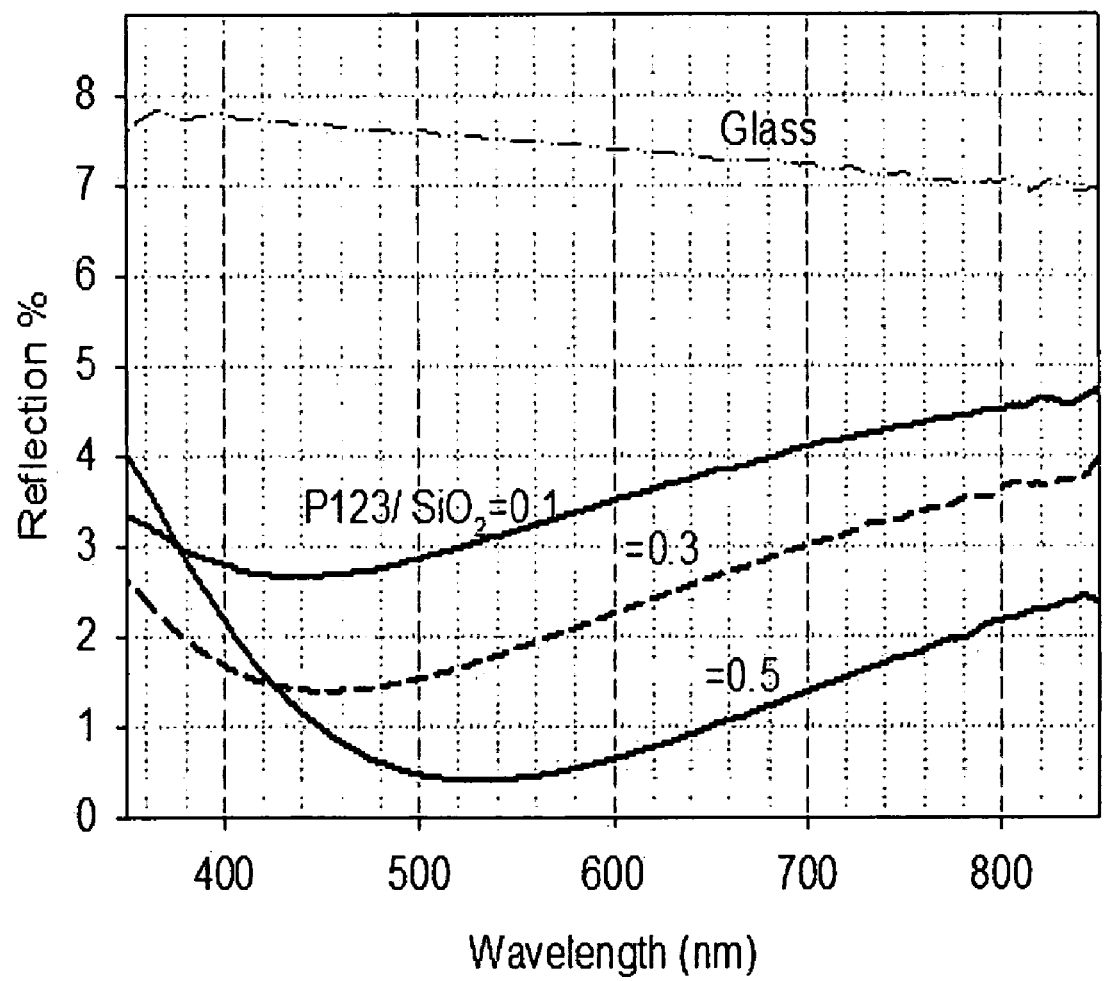
FIG. 6 is a graph showing the reflection spectra obtained from the compositions prepared in comparative example 2 with different amount of P123.

Comparing Characteristics of the AR Coatings Made of Zeolite Precursors Combined with Various Amounts of Sacrificed Porogen The zeolite precursor sol, which leads to a stronger coating, was combined with different amounts of sacrificed porogen, hoping to increase the porosity of the coated layer. The sacrificed porogens used were Tween 20 (polyoxyethylene$_{20}$ sorbitan monostearate), Tween 80 (polyoxyethylene sorbitan monolaurate), and P123 ($EO_{20}PO_{70}EO_{20}$ tri-block copolymer) in Table 3, 4, and 5, respectively. The AR coating was prepared as described similar to above. In addition to the pencil hardness, the adhesion of the coated layer was also tested according to ASTM D3359 (Cross-cut/Tape Test) standard method. The results were listed in Table 3 to 5 and the spectra given in FIGS. 4 to 6.

TABLE 3

AR coatings prepared from compositions containing zeolite precursor sol and porogen Tween 20.

| | Porogen/Silica ratio by weight | | | |
|---|---|---|---|---|
| | 0.1 | 0.3 | 0.5 | 0.7 |
| Wavelength at minimum reflection (nm) | 530 | 530 | 540 | 620 |
| Minimum Reflection (%) | 1.9 | 1.7 | 1.1 | 1.3 |
| Refractive index | 1.347 | 1.343 | 1.324 | 1.324 |
| Thickness (nm) | 97 | 101 | 102 | 116 |
| Porosity | 0.406 | 0.414 | 0.451 | 0.451 |
| Adhesion | 5B | 5B | 5B | 5B |
| Hardness | 3H | 3H | 3H | H |

TABLE 4

AR coatings prepared from compositions containing zeolite precursor sol and porogen Tween 80.

| | Porogen/Silica ratio by weight | | | |
|---|---|---|---|---|
| | 0.1 | 0.3 | 0.5 | 0.7 |
| Wavelength at minimum reflection (nm) | 515 | 550 | 620 | Broadband |
| Minimum Reflection (%) | 1.15 | 0.75 | 0.7 | 0.25 |
| Refractive index | 1.319 | 1.301 | 1.298 | ~ |
| Thickness (nm) | 98 | 102 | 119 | ~ |

TABLE 4-continued

AR coatings prepared from compositions containing zeolite precursor sol and porogen Tween 80.

| | Porogen/Silica ratio by weight | | | |
|---|---|---|---|---|
| | 0.1 | 0.3 | 0.5 | 0.7 |
| Porosity | 0.46 | 0.495 | 0.451 | ~ |
| Adhesion | 5B | 5B | 5B | 5B |
| Hardness | <H | <H | <H | <H |

TABLE 5

AR coatings prepared from compositions containing zeolite precursor sol and porogen P123.

| | Porogen/Silica ratio by weight | | |
|---|---|---|---|
| | 0.1 | 0.3 | 0.5 |
| Wavelength at minimum reflection (nm) | 440 | 450 | 530 |
| Minimum Reflection (%) | 2.7 | 1.3 | 0.4 |
| Refractive index | 1.376 | 1.326 | 1.271 |
| Thickness (nm) | 81 | 85 | 102 |
| Porosity | 0.348 | 0.447 | 0.454 |
| Adhesion | 5B | 5B | 5B |
| Hardness | <H | <H | <H |

It was found that the addition of sacrificed porogen did lead to certain increase of the porosity, and consequently a reduction of the refractive index. However, except for the case of adding Tween 20, the coatings became very soft, and cannot be used for practical purpose. Even in the case with adding Tween 20, the refractive index is still higher than the desired value, and the average reflection between 400 to 800 nm remained higher than desired.

EXAMPLE

Figure 7:
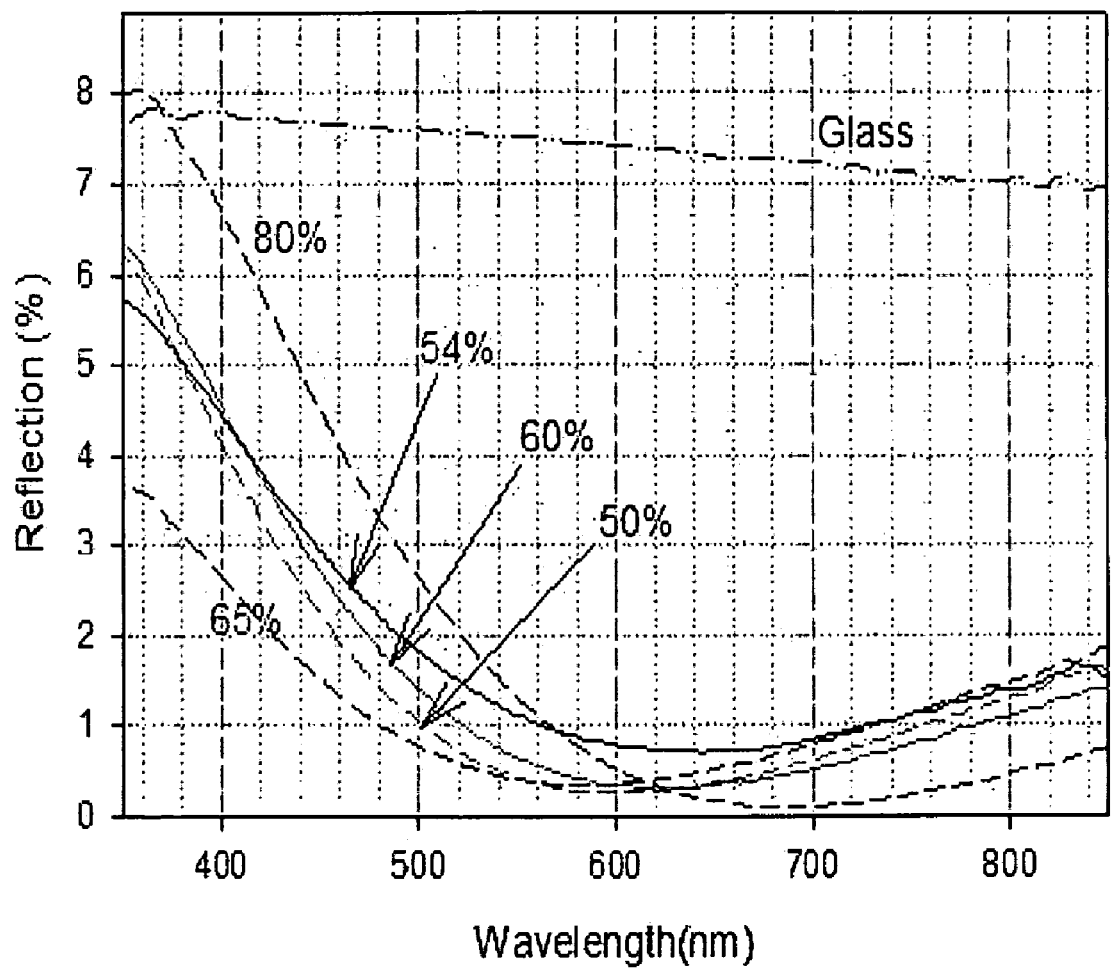
FIG. 7 is a graph showing the reflection spectra obtained from the compositions prepared in example, with different percentage of zeolite nanocrystals in combination with the zeolite precursor sol.
Figure 8:
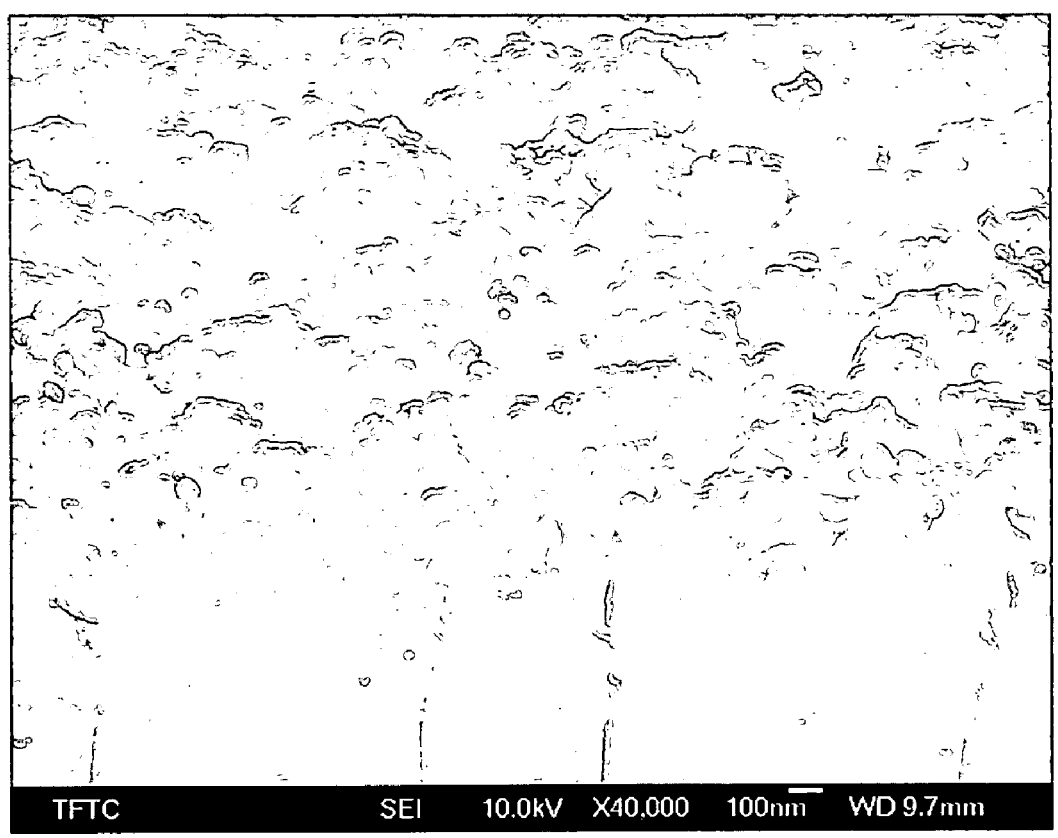
FIG. 8 is a representative SEM picture illustrating the AR coating surface prepared in example 3.

AR Coatings Made of Zeolite Precursors Combined with Various Amounts of Zeolite Nanocrystals In order to increase the porosity of the coated layer, compositions were prepared with different ratios of the zeolite nanocrystals in combination with the zeolite precursor. In all cases, an amount of a wetting agent, Tween 20 surfactant, at 1 wt % to that of silica was added for better wetting. AR coatings were prepared from these compositions, and following the same procedures of curing and calcination. The reflection spectra were presented in FIG. 7. The SEM picture of the surface of the sample prepared is given in FIG. 8. In addition to the adhesion and hardness tests, the boiling water test and Cycle Humidity Oven/Crosshatch Adhesion (CHOCA) test were also done according to Colts Laboratories Real Life Simulation Test SOP. The results of these tests were collected in Table 6. Here, the NC/(ZP+NC) is a weight ratio of zeolite nanocrystal to the sum of zeolite nanocrystal and zeolite precursor.

TABLE 6

Results on AR coatings prepared from composition containing both the zeolite precursor (ZP) and zeolite nanocrystals (NC).

| | NC/(ZP + NC) | | | | |
|---|---|---|---|---|---|
| | 0.5 | 0.54 | 0.6 | 0.65 | 0.8 |
| Wavelength at minimum reflection (nm) | 602 | 644 | 626 | 583 | 687 |
| Minimum Reflection (%) | 0.26 | 0.71 | 0.31 | 0.34 | 0.09 |
| Average Reflection (%) | 1.05 | 1.52 | 1.17 | 0.93 | 1.61 |
| Average transmittance (%) | 96.13 | 96.41 | 96.4 | 95.95 | 96.48 |

TABLE 6-continued

Results on AR coatings prepared from composition containing both the zeolite precursor (ZP) and zeolite nanocrystals (NC).

| | NC/(ZP + NC) | | | | |
|---|---|---|---|---|---|
| | 0.5 | 0.54 | 0.6 | 0.65 | 0.8 |
| Thickness (nm) | 121 | 126 | 123 | 113 | 136 |
| Refractive index | 1.269 | 1.3 | 1.272 | 1.275 | 1.251 |
| Porosity | 0.555 | 0.497 | 0.549 | 0.544 | 0.588 |
| Hardness | 4H | 4H | 4H | 3H | 2H |
| Average Reflection after CHOCA (%) | 1.62 | 0.92 | 1.24 | 0.83 | 1.77 |
| Average Reflection after Boiling Water (%) | 1.55 | 1.23 | 1.26 | 0.92 | 1.69 |

Clearly, with the combination of zeolite nanocrystals and zeolite precursors, the quality of the antireflection layer is much better. A pencil hardness could higher then 4H can be achieved, and even after CHOCA test and boiling water treatment, the average reflection can still remain below 1.5%. In particular, while the weight ratio of the zeolite nanocrystals to the zeolite precursor in the range of from 3:7 to 7:3, the abrasive resistance of the anti-reflection film is sufficient for commercial application. In addition, the surface of the anti-reflection film according to the present invention is superhydrophilic, thereby preventing the surface from fingerprints by touching. In the present invention, the zeolite precursors transform into zeolite under heating, and serves as glue to bind the zeolite nanocrystals together and also bind the zeolite nanocrystals with the substrate. Therefore, the abrasive resistance of the anti-reflection film is improved. Further, the zeolite nanocrystals have already been formed in the coating composition, thereby decreasing the time period of calcination.

What is claimed is:

1. An anti-reflection coating composition having a pH of 7 to 11, comprising:
   a plurality of zeolite nanocrystals having a particle size of 40-100 nm;
   a zeolite precursor obtained by a hydrolytic polycondensation of tetraalkoxysilanes in an aqueous solution of tetraalkylammonium hydroxide;
   a wetting agent; and
   a solvent;
   wherein the concentrations of the zeolite nanocrystals, the zeolite precursor, and the wetting agent are respectively 0.3-4% by weight, 0.3-4% by weight, and 0.03-0.2% by weight.

2. The anti-reflection coating composition according to claim 1, wherein a weight ratio of the zeolite nanocrystals to the zeolite precursor ranges from 3:7 to 7:3.

3. The anti-reflection coating composition according to claim 1, wherein the zeolite nanocrystals are selected from the group consisting of silica zeolite, aluminum silicate zeolite, and titanium silicate zeolite having MFI or BEA zeolite structure.

4. The anti-reflection coating composition according to claim 1, wherein the molar ratio of tetraalkylammonium hydroxide to tetraalkoxysilanes is about 0.17 to about 0.6.

5. The anti-reflection coating composition according to claim 1, wherein the solvent is a combination of water and an alcohol having less than 4 carbons.

6. The anti-reflection coating composition according to claim 1, wherein the tetraalkylammonium hydroxide is tetrapropyl ammonium hydroxide.

7. The anti-reflection coating composition according to claim 1, wherein the tetraalkoxysilane is tetraethylorthosilicate.

* * * * *